United States Patent
Sakamoto et al.

(10) Patent No.: US 6,848,001 B1
(45) Date of Patent: Jan. 25, 2005

(54) LOGICAL PATH ESTABLISHING METHOD AND STORAGE MEDIUM

(75) Inventors: Shigeru Sakamoto, Yokohama (JP); Masanori Itoh, Yokohama (JP); Toshihiro Ikeda, Yokohama (JP); Yasuhiro Ogasawara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/515,105

(22) Filed: Feb. 29, 2000

(30) Foreign Application Priority Data

Jul. 21, 1999 (JP) .......................................... 11-206821

(51) Int. Cl.⁷ ............................. G06F 15/16; G06F 3/00
(52) U.S. Cl. ....................... 709/227; 709/201; 709/236; 710/38
(58) Field of Search ................................. 709/201, 208, 709/209, 211, 216, 227, 228, 236; 710/36, 38

(56) References Cited

U.S. PATENT DOCUMENTS

| 5,414,851 A | * | 5/1995 | Brice et al. .................. 709/104 |
| 5,420,988 A | * | 5/1995 | Elliott ......................... 712/300 |
| 5,539,915 A | * | 7/1996 | Burton et al. .................. 710/21 |
| 5,574,950 A | * | 11/1996 | Hathorn et al. ................ 710/8 |
| 5,680,580 A | * | 10/1997 | Beardsley et al. ............. 714/6 |
| 5,920,695 A | * | 7/1999 | Hathorn et al. ............. 709/208 |
| 6,553,407 B1 | * | 4/2003 | Ouchi ........................ 709/206 |

FOREIGN PATENT DOCUMENTS

| JP | 7-44486 | 2/1995 |
| JP | 8-274791 | 10/1996 |

* cited by examiner

Primary Examiner—William C. Vaughn, Jr.
Assistant Examiner—George C. Neurauter, Jr.

(57) ABSTRACT

A logical path establishing method establishes a logical path between peer-to-peer in a peer-to-peer remote copy (PPRC) function. The logical path establishing method uses a step of including a link control frame for controlling a link in a frame which is used as a unit of information transfer, so as to include information necessary for establishing the logical path in the link control frame.

14 Claims, 8 Drawing Sheets

| Link-Level-Control-Function | Meaning |
|---|---|
| Establish Logical Path (ELP) | Request to Establish Logical Path |
| Logical Path Established (LPE) | Successful Establishment of Logical Path |
| Request node ID (RID) | Request Node ID |
| ID Response (IDR) | Notify Validity of ID Peculiar to RID |

| Link-Level-Control-Function | Meaning |
|---|---|
| Establish P P R C Path (EPP) | : Request to Establish P P R C Path |
| P.P R C Path Established (PPE) | : Successful Establishment of P P R C Path |

FIG. 6A

EPP :

Information Field

| P−CU Identifier | P−PRA Position Information | S−CU Identifier | S−PRA Position Information | Other Information |
|---|---|---|---|---|

FIG. 6B

PPE :

Information Field

| Reason Code | PPRC Path Information of S-CU in Case of Normal End |
|---|---|
| | Set Information of Part Where Error is Generated in Case of Abnormal End |

LOGICAL PATH ESTABLISHING METHOD AND STORAGE MEDIUM

BACKGROUND OF THE INVENTION

1. Field of the Invention

The present invention generally relates to logical path establishing method and storage mediums, and more particularly to a logical path establishing method for establishing a logical path in a peer-to-peer connection and to a computer-readable storage medium which stores a program for causing a computer to establish a logical path by such a logical path establishing method.

2. Description of the Related Art

A peer-to-peer remote copy (hereinafter simply referred to as a PPRC) function is a synchronous copy function which prepares a standby secondary system (hereinafter simply referred to as a secondary system) separately from a working primary system (hereinafter simply referred to as a primary system), connects the primary system and the secondary system by an ESCON interface, and maintains data equivalence between the primary system and the secondary system. When the data equivalence is maintained between the primary system and the secondary system by copying the data written to the primary system to the secondary system in synchronism with the writing of the data to the primary system, it becomes possible to quickly and positively recover the data from the secondary system even when the primary system fails due to an accident such as a fire, without a large time delay in restoring lost data.

Figure 1:
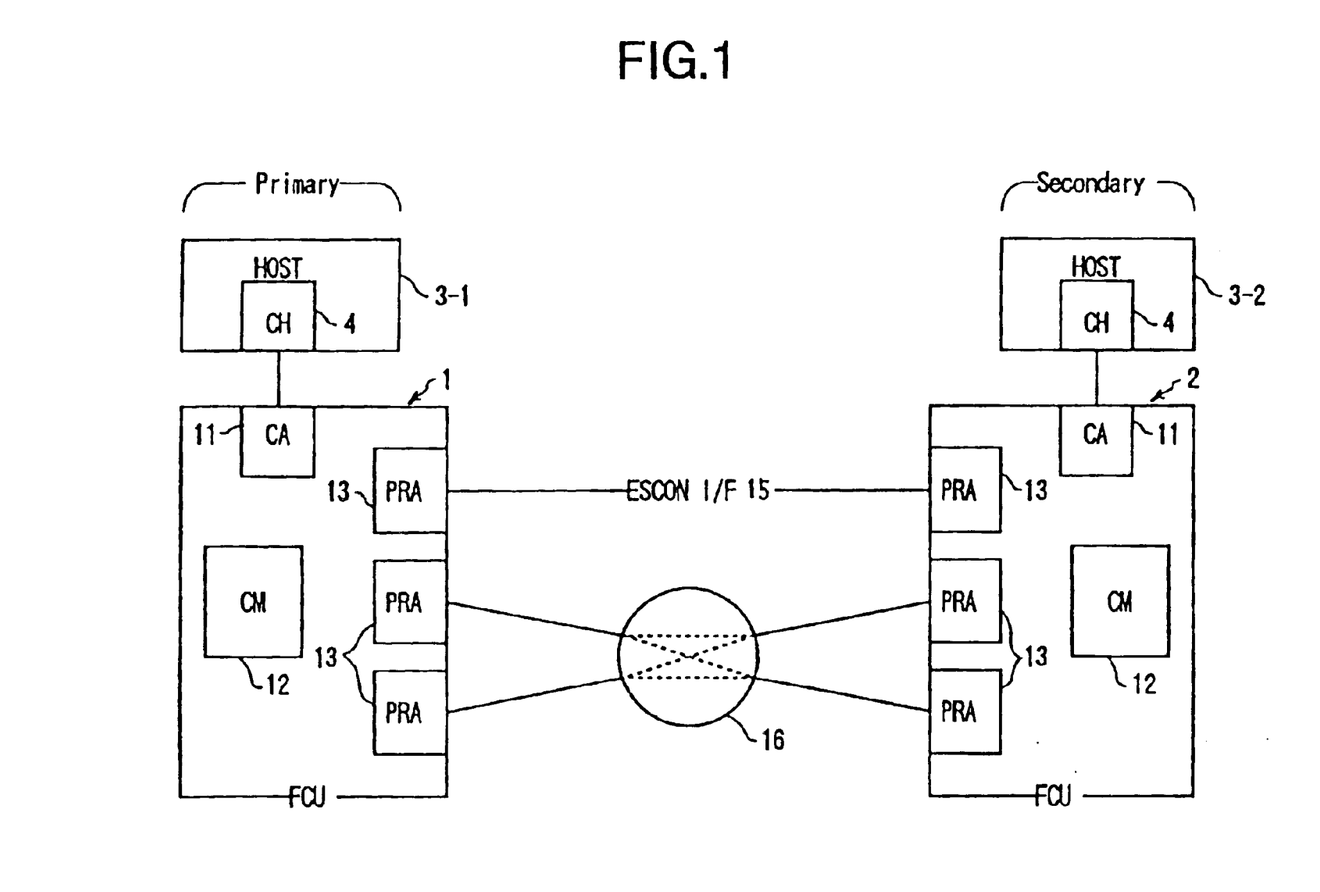
FIG. 1 is a system block diagram showing the construction of an example of file control units which form a primary system and a secondary system.

A file control units (FCUs) which form the primary system and the secondary system are constructed as shown in FIG. 1, for example. A primary FCU 1 is coupled to a host unit 3-1, and a secondary FCU 2 is coupled to a host unit 3-2. Each of the primary and secondary FCUs 1 and 2 includes a channel adapter (CA) 11, a centralized module (CM) 12, and a plurality of peer remote adapters (PRAs) 13. The CA 11 is provided to carry out an external interface control with respect to a channel (CH) 4 of the corresponding one of the host units 3-1 and 3-2. The CM 12 is provided to manage resources and the like within the corresponding one of the FCUs 1 and 2 to which this CM 12 belongs. The PRA 13 is provided to carry out an interface control with respect to an ESCON interface (ESCON I/F) 15. The switching of a path between the PRA 13 within the FCU1 and the PRA 13 within the FCU 2 is carried out by an ESCON director 16.

Figure 2:
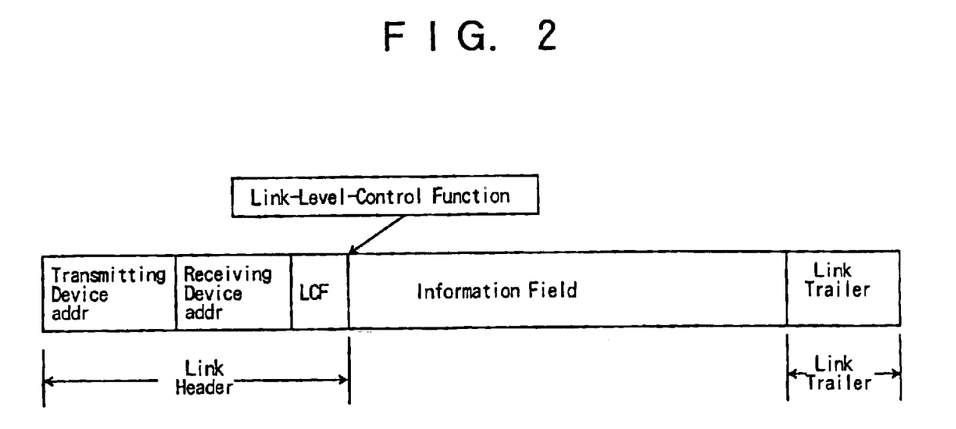
FIG. 2 is a diagram showing the format of a frame.

An information transfer via the ESCON I/F 15 is carried out in units of frames. The frames have variable lengths, but header portions of the frames have a common format, as shown in FIG. 2. As may be seen from FIG. 2, the frame includes a link header, an information field, and a link trailer. The link header includes an transmitting device address, a receiving device address, and a link control field (LCF), and is provided to specify the other party with respect to the switch.

Figure 3:
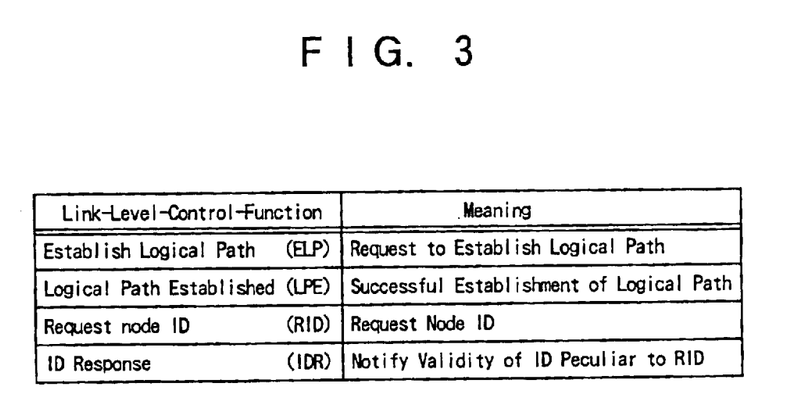
FIG. 3 is a diagram for explaining a link level control function.

The frames can be categorized into a link control frame which controls the link, and a device frame which controls input and/or output (I/O) processes between the frames. The LCF included in the link header indicates whether the frame is the link control frame or the device frame. In addition, the LCF also includes the details of the control as shown in FIG. 3, by a link-level-control function. In FIG. 3, an establish logical path (ELP) requests a logical path to be established, a logical path established (LPE) indicates successful establishment of the logical path, request node ID (RID) requests a node ID, and an ID response (IDR) notifies validity of the ID peculiar to the node with respect to the RID.

The link of the ESCON I/F 15 enables the I/O processes by establishing the logical path after establishing the physical path.

When transferring data to the secondary FCU 2 by the PPRC function, a logical path must be established between the peer-to-peer. In the following description, the logical path which is used by the PPRC function will be referred to as a PPRC path. This PPRC path is established by a command of the host unit 3-1. This command includes parameters such as an identifier of the primary FCU 1 and an identifier of the secondary FCU 2 which specify which parts between the primary FCU 1 and the secondary FCU 2 are to be logically connected, position information of the PRA 13 within the primary FCU 1, and position information of the FRA 13 within the secondary FCU 2.

Figure 4:
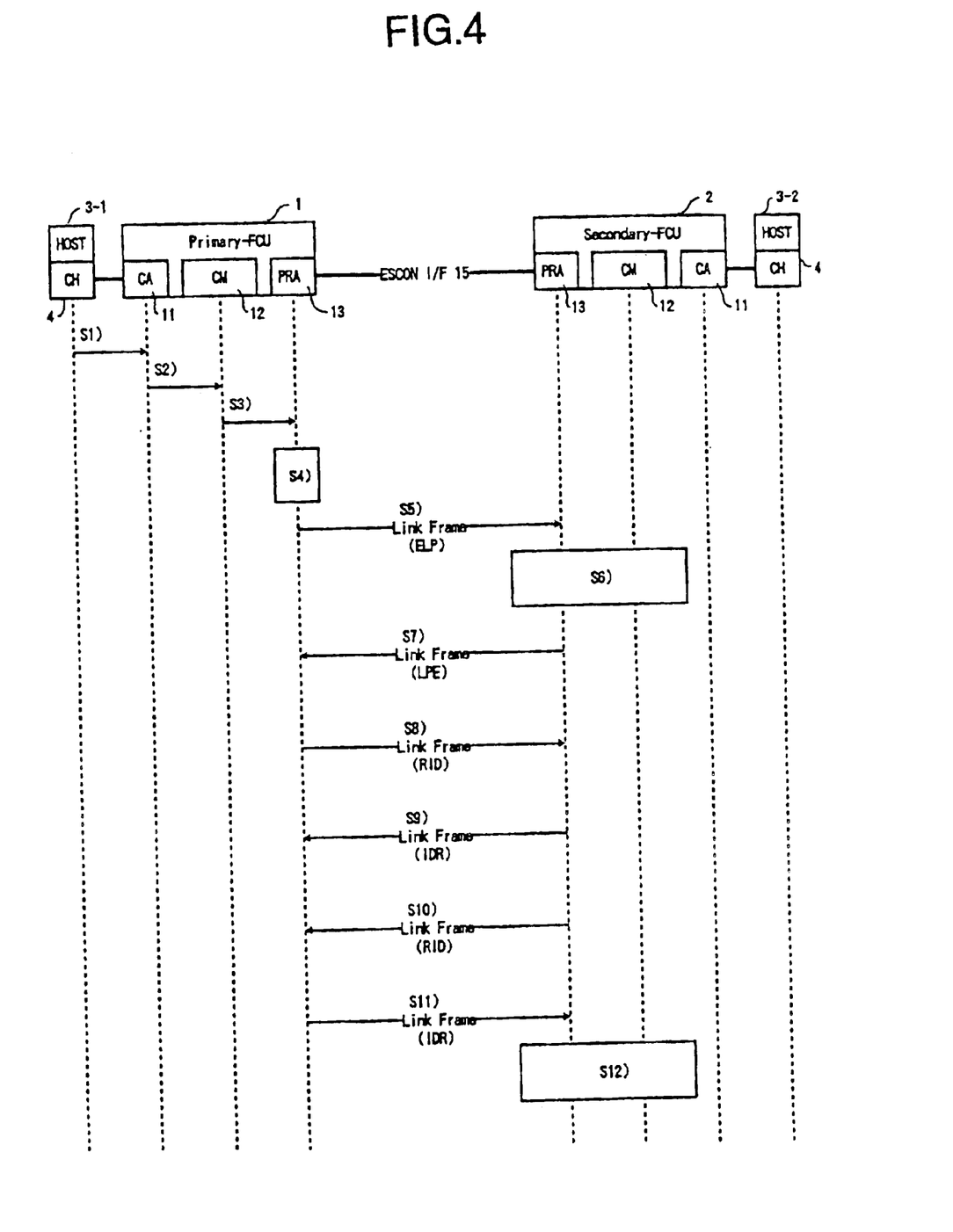
FIG. 4 is a diagram for explaining a PPRC path establishing sequence.

In order to establish the PPRC path, a sequence which will be described with reference to FIG. 4 is carried out between the primary FCU 1 and the secondary FCU 2 after the physical path is established on the ESCON I/F 15. In FIG. 4, those parts which are the same as those corresponding parts in FIG. 1 are designated by the same reference numerals, and a description thereof will be omitted.

In a step s1) shown in FIG. 4, the CA 11 within the primary FCU 1 receives a PPRC path set command from the host unit 3-1. In a step s2), the CA 11 within the primary FCU 1 notifies the acceptance of the PPRC path set command to the CM 12 within the primary FCU 1. In a step s3), the CM 12 within the primary FCU 1 allocates the corresponding PRA 13 within the primary FCU 1, and makes a PPRC path set request with respect to this PRA 13. In a step s4), the PRA 13 within the primary FCU 1 transfers the ELP to the PRA 13 within the secondary FCU 2 by the LCF, and makes a logical path establish request.

In a step s5), the PRA 13 within the secondary FCU 2 recognizes that the logical path is established. However, at this point in time, there is no recognition that the established logical path is a PPRC path. In a step s6), the PRA 13 within the secondary FCU 2 transfers the LPE to the PRA 13 within the primary FCU 1 by the LCF, and notifies the successful establishment of the logical path. In a step s7), the PRA 13 within the primary FCU 1 transfers the RID to the PRA 13 within the secondary FCU 2 by the LCF, and requests an information notification of the secondary FCU 2.

In a step s8), the PRA 13 within the secondary FCU 2 transfers the IDR to the PRA 13 within the primary FCU 1 by the LCF, and notifies the information of the secondary FCU 2 stored within the secondary FCU 2. In a step s9), the PRA 13 within the primary FCU 1 checks whether or not the information of the secondary FCU 2 received from the PRA 13 within the secondary FCU 2 matches the requested information of the secondary FCU 2, and creates PPRC path set information if the information of the secondary FCU 2 match. In a step s10), the PRA 13 within the secondary FCU 2 transfer the RID to the PRA 13 within the primary FCU 1 by the LCF, and requests an information notification of the primary FCU 1. In a step s11), the PRA 13 within the primary FCU 1 transfers the IDR to the PRA 13 within the secondary FCU 2 by the LCF, and notifies the information of the primary FCU 1 stored within the primary FCU 1. In a step s12), the PRA 13 within the secondary FCU 2 recognizes that the set logical path is the PPRC path, based on the information of the primary FCU 1 received from the PRA 13 of the primary FCU 1.

SUMMARY OF THE INVENTION

However, in the sequence described above, it is necessary to carry out an operation of reading the information of the other party after establishing the logical path. As a result, there is a problem in that the sequence of the link control frame must be carried out a plurality of times.

In addition, the PRA 13 within the secondary FCU 2 can first recognize that the PPRC path is set only at the stage of the step s11). For this reason, there is a problem in that the secondary FCU 2 must create internal information for enabling operation as the PPRC path after the step s11).

Accordingly, it is a general object of the present invention to provide a novel and useful logical path establishing method and storage medium, in which the problems described above are eliminated.

Another and more specific object of the present invention is to provide a logical path establishing method and a storage medium which can simplify the sequence of the link control frame and establish the logical path between the peer-to-peer in a relatively simple manner.

Still another object of the present invention is to provide a logical path establishing method for establishing a logical path between peer-to-peer in a peer-to-peer remote copy (PPRC) function, comprising a step of including a link control frame for controlling a link in a frame which is used as a unit of information transfer, so as to include information necessary for establishing the logical path in the link control frame. According to the logical path establishing method of the present invention, it is possible to simplify the sequence of the link control frame, and establish the logical path between the peer-to-peer in a relatively simple manner.

A further object of the present invention is to provide a computer-readable storage medium which store a program for causing a computer to establish a logical path between peer-to-peer in a peer-to-peer remote control (PPRC) function, comprising means for causing the computer to include a link control frame for controlling a link in a frame which is used as a unit of information transfer, so as to include information necessary for establishing the logical path in the link control frame. According to the computer-readable storage medium of the present invention, it is possible to simplify the sequence of the link control frame, and establish the logical path between the peer-to-peer in a relatively simple manner.

Other objects and further features of the present invention will be apparent from the following detailed description when read in conjunction with the accompanying drawings.

DESCRIPTION OF THE PREFERRED EMBODIMENTS

A description will be given of an embodiment of a logical path establishing method according to the present invention. File control units (FCUs) which form a primary system and a secondary system and are applied with this embodiment of the logical path establishing method may have a construction shown in FIG. 1 described above. Accordingly, in the following description, this embodiment will be described by referring to the system shown in FIG. 1.

In the PPRC function, the logical path between the peer-to-peer is established by responding to a set command which is issued from the host unit 3-1 with respect to the primary FCU 1. The parameters of this set command include information of the secondary FCU 2, and it is necessary for the primary FCU 1 to discontinue establishing the logical path if the parameters are illegitimate.

Conventionally when establishing the logical path between the peer-to-peer, the primary FCU 1 and the secondary FCU 2 establish the logical frame by the link control frame, and thereafter recognize that the logical path is the PPRC path by carrying out a sequence a plurality of times.

On the other hand, in this embodiment, a link control frame having an extended information field is used. When the primary FCU 1 establishes the logical path between the peer-to-peer, the link control frame having the extended information field is sent to the secondary FCU 2, by adding the information which is necessary to establish the logical path between the peer-to-peer to the link control frame in advance. Hence, it is possible to simplify the sequence of the link control frame when establishing the logical path between the peer-to-peer.

Figure 5:
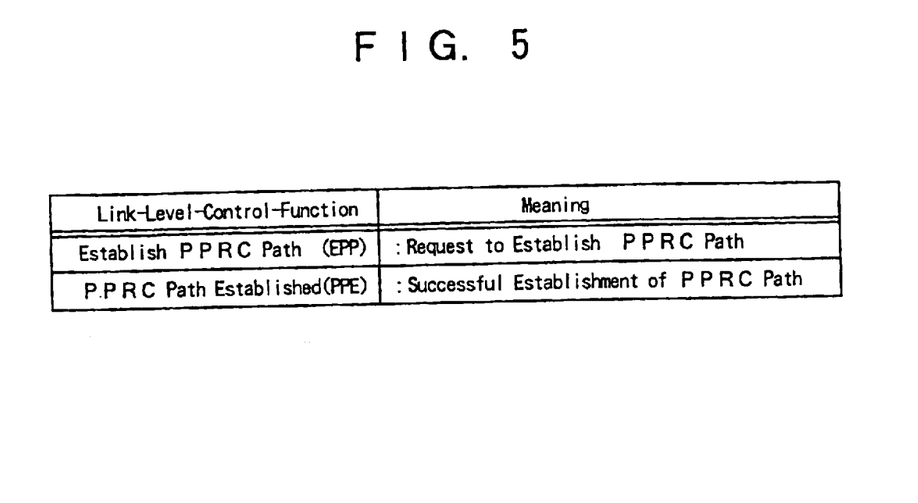
FIG. 5 is a diagram for explaining a link level control function which is used in an embodiment of a logical path establishing method according to the present invention.

FIG. 5 is a diagram showing a link level control function included in the link control frame which is used in this embodiment, in addition to the link control function shown in FIG. 3. In FIG. 5, an establish PPRC path (EPP) indicates a request to establish the PPRC path, and a PPRC established (PPE) indicates a successful establishment of the PPRC path.

Figure 6A:
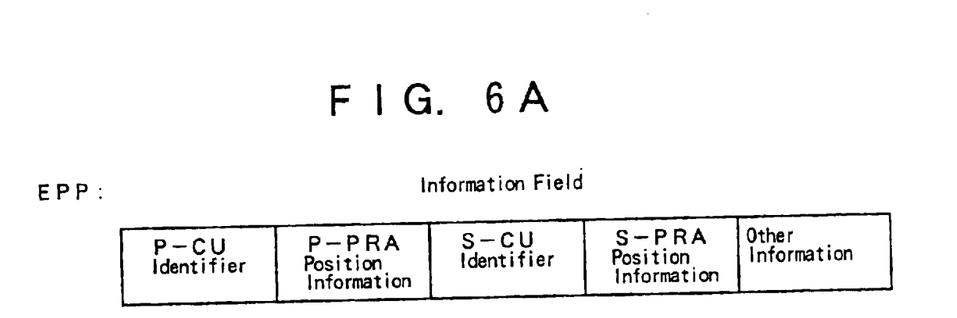
FIGS. 6A and 6B respectively are diagrams for explaining an information field of a link control frame.
Figure 6B:
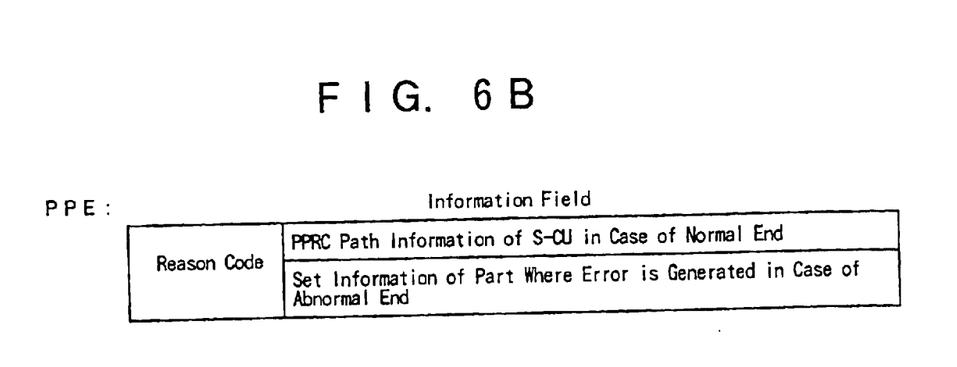

The EPP includes an information field shown in FIG. 6A, and the PPE includes an information field shown in FIG. 6B. The EPP includes an identifier of the primary FCU 1 (P-CU identifier), position information of the PRA 13 of the primary FCU 1 (P-PRA position information), an identifier of the secondary FCU 2 (S-CU identifier), position information of the PRA 13 of the secondary FCU 2 (S-PRA position information), and other information. On the other hand, the PPE includes a reason code, information of the PPRC path of the secondary FCU 2 in the case of a normal end, and set information of a part where an error is generated in the case of an abnormal end.

Figure 7:
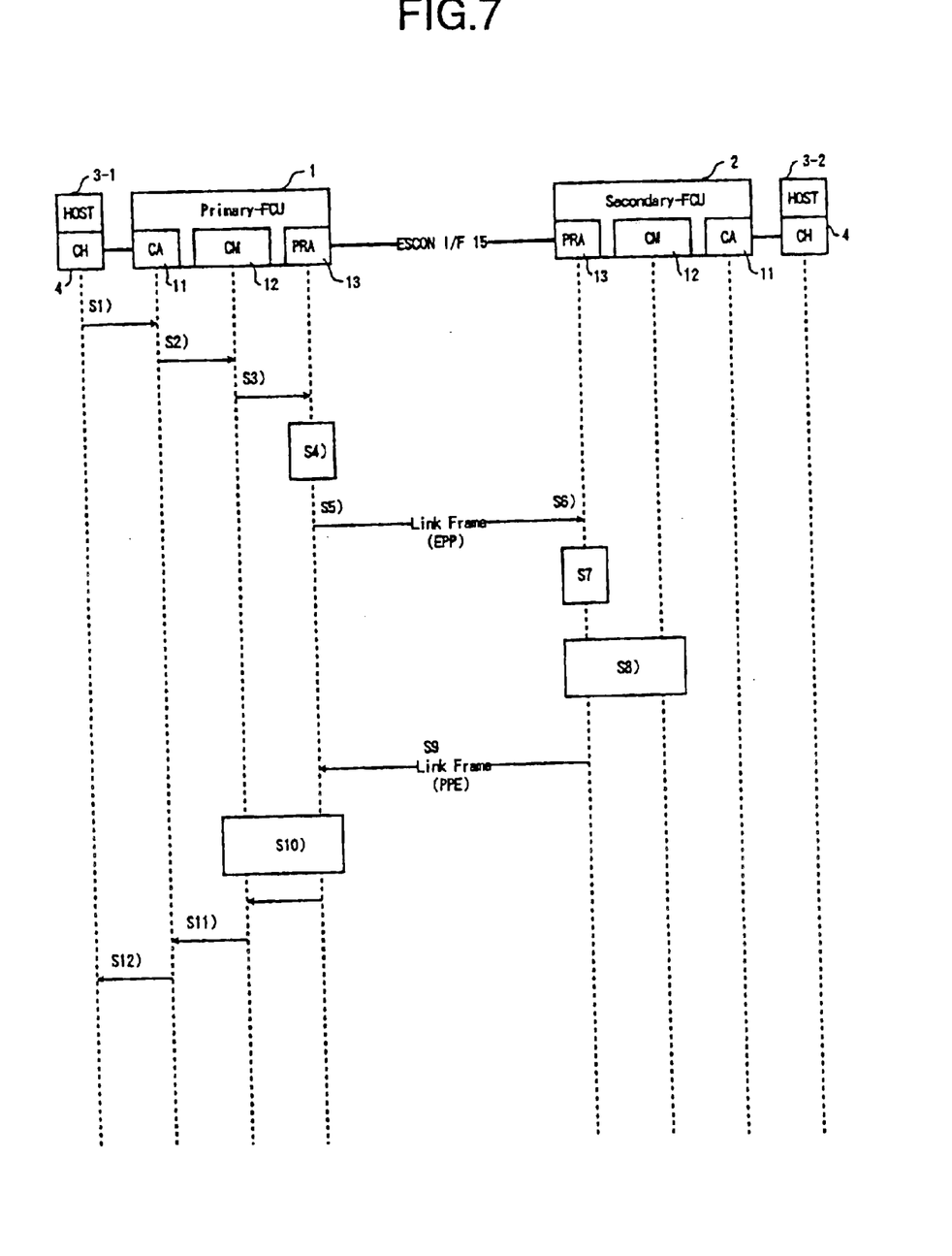
FIG. 7 is a diagram for explaining a PPRC path establishing sequence of the embodiment of the logical path establishing method.

In order to establish the PPRC path, after the physical path is established on the ESCON I/F 15, a sequence which will be described with reference to FIG. 7 is carried out between the primary FCU 1 and the secondary FCU 2. In FIG. 7, those parts which are the same as those corresponding parts in FIG. 1 are designated by the same reference numerals, and a description thereof will be omitted. The primary FCU 1 and the secondary FCU 2 respectively have identifiers peculiar thereto, that is, the P-CU identifier and the S-CU identifier.

In a step S1 shown in FIG. 7, the CA 11 within the primary FCU 1 receives a PPRC path set request and set information of the PPRC path from the host unit 3-1. The set information of the PPRC path includes the identifier of the primary FCU 1 (P-CLU identifier), the position information of the PRA 13 of the primary FCU 1 (P-PRA position information), the identifier of the secondary FCU 2 (S-CU identifier), the position information of the PRA 13 of the secondary FCU 2 (S-PRA position information), and other information, similarly to the EPP shown in FIG. 6A. In other words, the host unit 3-1 uses the set information to specify the FCU to which the PPRC path is to be established.

In a step S2), the CA 11 within the primary FCU 1 notifies acceptance of the PPRC path set request to the CM 12 within the primary FCU 1. Accordingly, the CM 12 within the primary FCU 1 compares the identifier of the primary FCU (P-CU identifier) included in the set information, and the identifier of the primary FCU 1 to which this CM 12 belongs, and an abnormal end occurs if the compared identifiers differ. In addition, the CM 12 within the primary FCU 1 checks whether or not the PPRC path exists in the path which is to be set, based on the PPRC path information stored in an internal memory of the primary FCU 1, and updates the PPRC path information if no PPRC path exists. At this point in time, this PPRC path information is invalidated.

In a step S3), the CM 12 within the primary FCU 1 allocates the corresponding PRA 13 within the primary FCU 1, based on the position information of the PRA 13 of the primary FCU 1 (PPRA position information) included in the set information, and makes the PPRC paths set request with respect to this corresponding PRA 13. An abnormal end occurs if the PRA 13 which corresponds to the position information of the PRA 13 of the primary FCU 1 (P-PRA position information) included in the set information does not exist within the primary FCU 1.

In a step S4), the PRA 13 within the primary FCU 1 creates logical path information and stores the logical path information therein.

In a step S5), the primary FCU 1 sends the EPP shown in FIGS. 5 and 6A to the secondary FCU 2 by the link control frame, and makes the PPRC path establish request. In the information field of this link control frame, the set information of the PPRC path from the host unit 3-1 is stored as the EPP.

In a step S6), the PRA 13 within the secondary FCU 2 receives the link control frame (EPP) issued from the PRA 13 within the primary FCU 1.

In a step S7), the PRA 13 within the secondary FCU 2 confirms whether or not the information of the secondary FCU within the information of the link control frame which is received from the PRA 13 within the primary FCU 1 matches the information of the secondary FCU 2 to which the PRA 13 of the secondary FCU 2 belongs. More particularly, the identifier of the secondary FCU (S-CU identifier) and the position information of the PRA of the secondary FCU (S-PRA position information) which are within the information field of the received link control frame, are respectively compared with the identifier of the secondary FCU 2 to which the PRA 13 of the secondary FCU 2 belongs (S-CU identifier) and the position information of the PRA 13 of the secondary FCU 2 (S-PRA position information).

In a step S8), the PRA 13 within the secondary FCU 2 creates the logical path information if the comparison results in the step S7) match. On the other hand, if the comparison result in the step S7) do not match, the process advances to a step S13) which will be described later with reference to FIG. 8.

In a step S9), the secondary FCU 2 sends the PPE shown in FIGS. 5 and 6B to the primary FCU 1 by the link control frame, and notifies successful establishment of the PPRC path. In the information field of this link control frame, the PPRC path information created within the secondary FCU 2 is stored as the PPE.

In a step S10), the primary FCU 1 receives the link control frame (PPE) issued from the secondary FCU 2, and recognizes that the PPRC path is established to the secondary FCU 2 as instructed. At this point in time, the PPRC path instructed from the host unit 3-1 is validated, and the completion of the PPRC path establishment is notified to the CM 12 within the primary FCU 1.

In a step S11), the CM 12 within the primary FCU 1 receives the PPRC path establish complete notification from the PRA 13 within the primary FCU 1, and notifies the normal completion of the PPRC path establishing operation to the CA 11 within the primary FCU 1.

In a step S12), the CA 11 within the primary FCU 1 notifies the normal end of the PPRC path set command to the CH 4 of the host unit 3-1, and the process ends.

Figure 8:
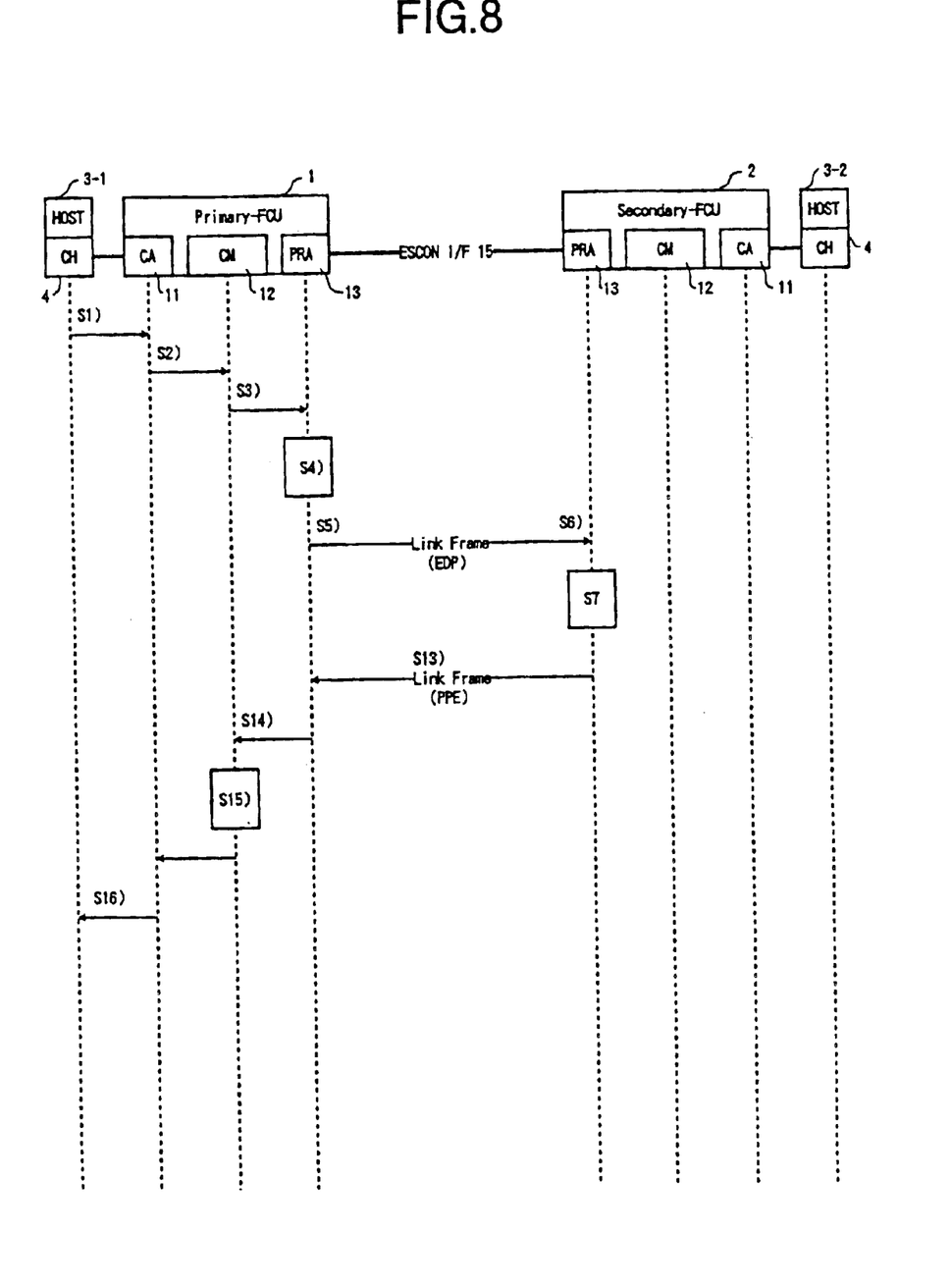
FIG. 8 is a diagram for explaining the PPRC path establishing sequence of the embodiment of the logical path establishing method at the time of an abnormal operation.

FIG. 8 is a diagram for explaining the sequence for the case where the comparison results in the step S7) do not match. In FIG. 8, those parts and steps which are the same as those corresponding parts and steps shown in FIG. 7 are designated by the same reference numerals, and a description thereof will be omitted. Steps S13) through S16) shown in FIG. 8 are carried out when the comparison results in the step S7) do not match.

In the step S13), the PRA 13 within the secondary FCU 2 notifies the PRA 13 within the primary FCU 1 that the PPRC path establishment failed, by the link control frame (PPE) having the information field which is added with the reason code shown in FIG. 6B. In this state, the set information of the part which caused the failure, shown in FIG. 6B, is added to the PPE as error information.

In the step S14), the PRA 13 within the primary FCU 1 creates a sense byte based on the information notified from the PRA 13 within the secondary FCU 2, and notifies the failure of the PPRC path establishment to the CM 12 within the primary FCU 1.

In the step S15), the CM 12 within the primary FCU 1 receives the PPRC path establishment failure notification from the PRA 13 within the primary FCU 1, and notifies the CA 11 within the primary FCU 1 that the PPRC path establishing operation failed.

In the step S16), the CA 11 within the primary FCU 1 notifies the abnormal end of the PPRC path set command to the CH 4 of the host unit 3-1, and the process ends.

Figure 9:
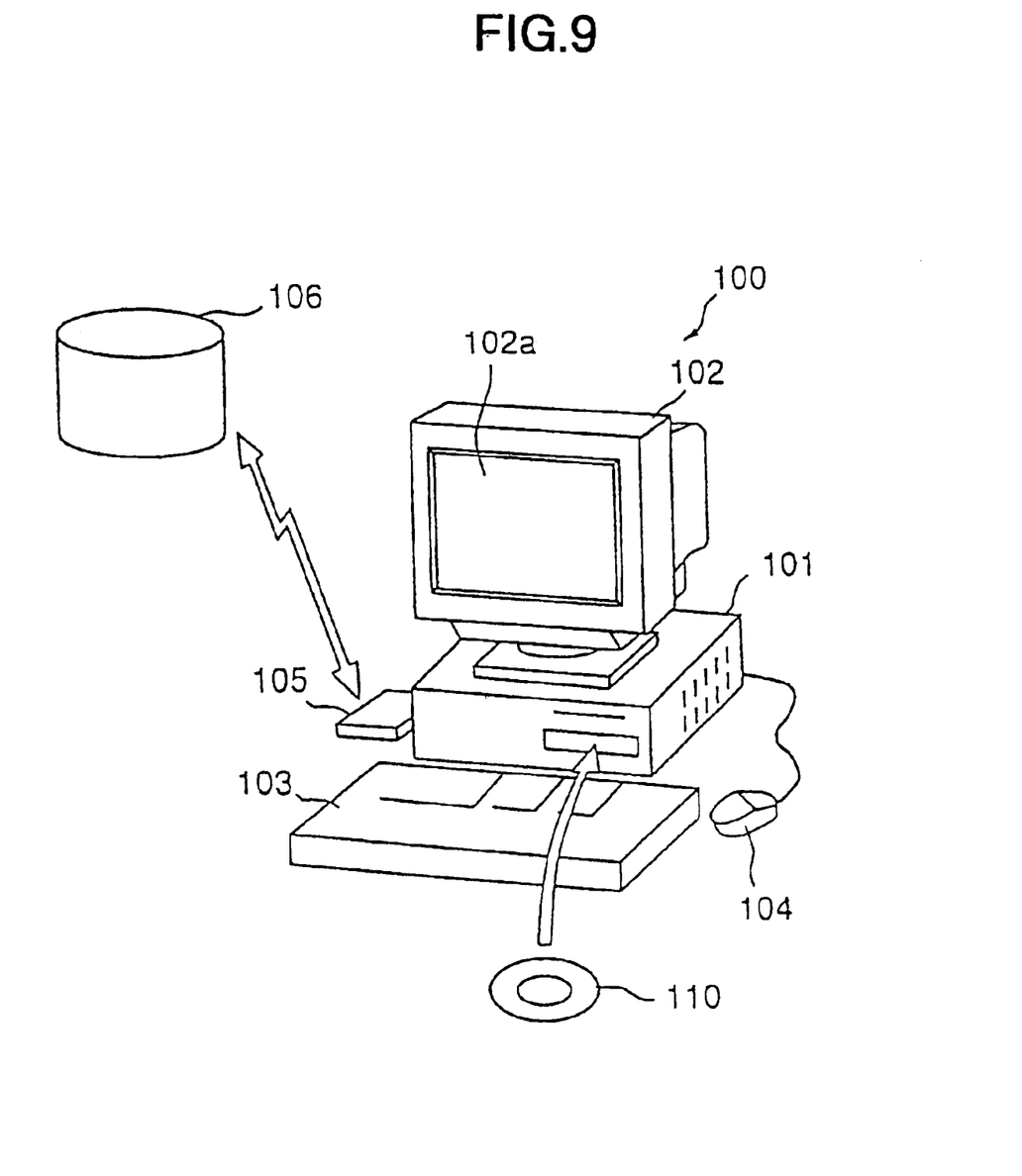
FIG. 9 is a perspective view showing a computer system.

FIG. 9 is a perspective view showing an embodiment of a computer system. The computer system shown in FIG. 9 can function as the FCUs 1 and 2 shown in FIG. 1.

In FIG. 9, a computer system 100 generally includes a main body 101 which is provided with a CPU, a disk drive and the like, a display 102 which displays an image on a display screen 102a thereof in response to an instruction from the main body 101, a keyboard 103 for inputting various information to the computer system 100, a mouse 104 for specifying an arbitrary position on the display screen 102a of the display 102, and a modem 105 which downloads a program or the like stored in another computer system by accessing an external database or the like.

A program which is stored in a portable recording medium such as a disk 110 or is downloaded from a recording medium 106 of another computer system using a communication unit such as the modem 105, is input to and compiled in the computer system 100. The computer system 100 carries out the processes of the embodiment described above based on this program.

A computer-readable storage medium according to the present invention is formed by a recording medium such as the disk 110 which stores the above described program. The recording medium which forms the storage medium of the present invention is not limited to a portable recording medium such as the disk 110, an IC card memory, a floppy disk, a magneto-optical disk and a CD-ROM, and includes various kinds of recording mediums capable of accessing a computer system which is coupled via a communication unit or a communication means such as the modem 105 and a LAN.

Figure 10:
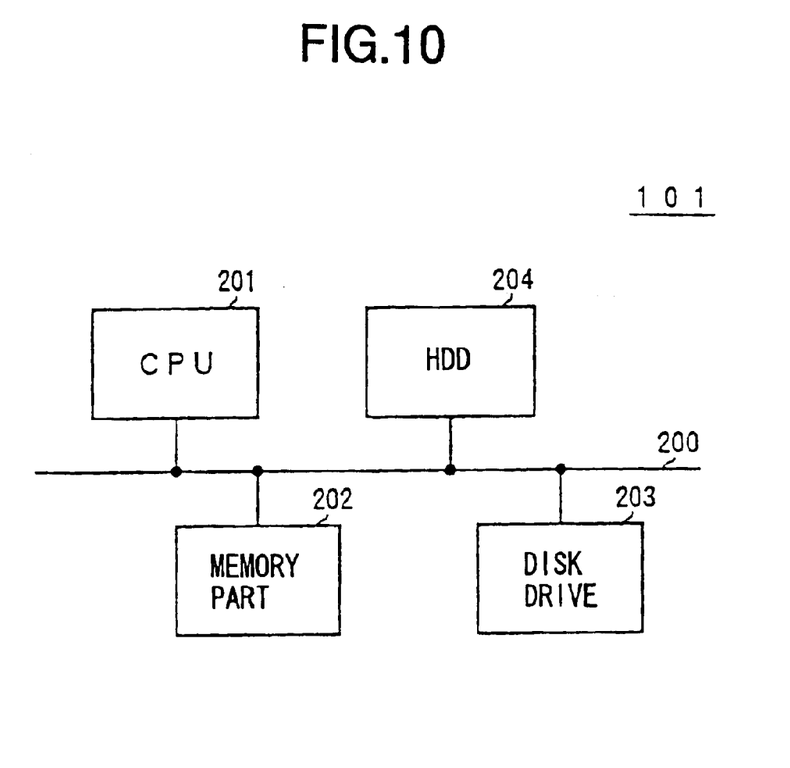
FIG. 10 is a system block diagram showing a main body of the computer system.

FIG. 10 is a system block diagram showing the construction of an important part within the main body 101 of the computer system 100. In FIG. 10, the main body 101 generally includes a CPU 201, a memory part 202 including a RAM, ROM or the like, a disk drive 203 for the disk 110, and a hard disk drive 204 which are coupled via a bus 200. The display 102, the keyboard 103, the mouse 104 and the like are coupled to the CPU 201, although the illustration thereof is omitted in FIG. 10.

Of course, the construction of the computer system 100 is not limited to that shown in FIGS. 9 and 10, and various other known constructions may be employed instead.

Further, the present invention is not limited to these embodiments, but various variations and modifications may be made without departing from the scope of the present invention.

What is claimed is:

1. A logical path establishing method, comprising:
   establishing a PPRC logical path between peers in a peer-to-peer remote copy (PPRC) function,
   said establishing a PPRC logical path including a link control frame to control a link in a frame that is used as a unit of information transfer, and including information necessary to establish the logical path in the link control frame, so as to establish the PPRC logical path by one exchange of the frame.

2. The logical path establishing method as claimed in claim 1, wherein said including a link control frame comprises including, in the link control frame, a link level control function of a path establish request and a link level control function of a successful establishment of a path.

3. The logical path establishing method as claimed in claim 2, wherein the link level control function of the path establish request comprises an identifier of a primary system, position information of a peer remote adapter (PRA) of the primary system, an identifier of a secondary system, and position information of a PRA of the secondary system.

4. The logical path establishing method as claimed in claim 2, wherein the link level control function of the successful establishment of the path comprises information of a peer-to-peer remote copy (PPRC) path of a secondary system in case of a normal end of establishing the logical path, and a reason code indicating set information of a part where an error is generated in case of an abnormal end of establishing the logical path.

5. The logical path establishing method as claimed in claim 1, further comprising:
   confirming legitimacy of the information included in the link control frame.

6. The logical path establishing method as claimed in claim 1, further comprising:
   creating information of a peer-to-peer remote copy (PPRC) path within a secondary system, based on the information included in the link control frame.

7. The logical path establishing method as claimed in claim 4, further comprising:
   including the reason code, which comprises an error code, in the link control frame, within the secondary system, and providing the error code to the primary system when the error is generated.

8. A computer-readable storage medium storing a program controlling a computer to establish a logical path, comprising:
   control means for controlling the computer to establish a PPRC logical path between pears in a peer-to-peer remote copy (PPRC) function,
   said control means including means for controlling the computer to include a link control frame for controlling a link in a frame that is used as a unit of information transfer, and to include information necessary for establishing the logical path in the link control frame, so as to establish the PPRC logical path by one exchange of the frame.

9. The computer-readable storage medium as claimed in claim 8, wherein the control means controls the computer to include, in the link control frame, a link level control function of a path establish request and a link level control function of a successful establishment of a path.

10. The computer-readable storage medium as claimed in claim 9, wherein the link level control function of the path establish request comprises an identifier of a primary system, position information of a peer remote adapter (PRA) of the primary system, an identifier of a secondary system, and position information of a PRA of the secondary system.

11. The computer-readable storage medium as claimed in claim 9, wherein the link level control function of the successful establishment of the path comprises information of a peer-to-peer remote copy (PPRC) path of a secondary system in case of a normal end of establishing the logical path, and a reason code indicating set information of a part where an error is generated in case of an abnormal end of establishing the logical path.

12. The computer-readable storage medium as claimed in claim 8, further comprising:
   means for controlling the computer to confirm legitimacy of the information included in the link control frame.

13. The computer-readable storage medium as claimed in claim 8, further comprising:
   means for controlling the computer to create information of a peer-to-peer remote copy (PPRC) path, within a secondary system, based on the information included in the link control frame.

14. The computer-readable storage medium as claimed in claim 11, further comprising:
   means for controlling the computer to include the reason code, which comprises an error code, in the link control frame, within the secondary system, and to provide the error code to the primary system when the error is generated.

* * * * *

UNITED STATES PATENT AND TRADEMARK OFFICE
CERTIFICATE OF CORRECTION

PATENT NO. : 6,848,001 B1
DATED : January 25, 2005
INVENTOR(S) : Shigeru Sakamoto et al.

It is certified that error appears in the above-identified patent and that said Letters Patent is hereby corrected as shown below:

Column 8,
Line 18, change "pears" to -- peers --.

Signed and Sealed this

Twelfth Day of July, 2005

JON W. DUDAS
*Director of the United States Patent and Trademark Office*